(12) United States Patent
Willford

(10) Patent No.: US 7,219,936 B1
(45) Date of Patent: May 22, 2007

(54) CAMPFIRE ROTISSERIE

(76) Inventor: Martin James Willford, 1130 Thorington Dr., Gladwin, MI (US) 48624

( * ) Notice: Subject to any disclaimer, the term of this patent is extended or adjusted under 35 U.S.C. 154(b) by 69 days.

(21) Appl. No.: 10/932,760

(22) Filed: Sep. 2, 2004

(51) Int. Cl.
*A47J 43/18* (2006.01)
*A47J 37/04* (2006.01)

(52) U.S. Cl. .................................. 294/61; 99/421 A
(58) Field of Classification Search .......... 294/5, 294/8, 9, 10, 61; 99/419, 421 A, 421 V; 30/322
See application file for complete search history.

(56) References Cited

U.S. PATENT DOCUMENTS

| | | | |
|---|---|---|---|
| 2,535,548 A * | 12/1950 | Porter ...................... | 99/421 A |
| 2,827,848 A * | 3/1958 | Alden ....................... | 99/421 R |
| 4,517,885 A | 5/1985 | Thompson | |
| 4,599,797 A * | 7/1986 | Bax ............................ | 30/323 |
| 5,117,558 A | 6/1992 | Hull | |
| 5,355,778 A | 10/1994 | Mayfield et al. | |
| 6,196,121 B1 * | 3/2001 | Crowl ....................... | 99/421 A |
| 6,270,132 B1 * | 8/2001 | Kretschmer .................... | 294/5 |
| 6,701,827 B1 * | 3/2004 | Longbrake ................... | 99/441 |
| 6,754,966 B2 | 6/2004 | Holzer | |

* cited by examiner

*Primary Examiner*—Dean J. Kramer
(74) *Attorney, Agent, or Firm*—Robert L. McKellar; McKellar IP Law, PLLC

(57) ABSTRACT

A hand held rotatable campfire rotisserie. The device features the ability to rotate the tined end from the handle end internally. The length of the overall device allows the user to roast items placed over a heat source at a comfortable distance from the heat source. The rotisserie action allows the food items to cook evenly.

18 Claims, 9 Drawing Sheets

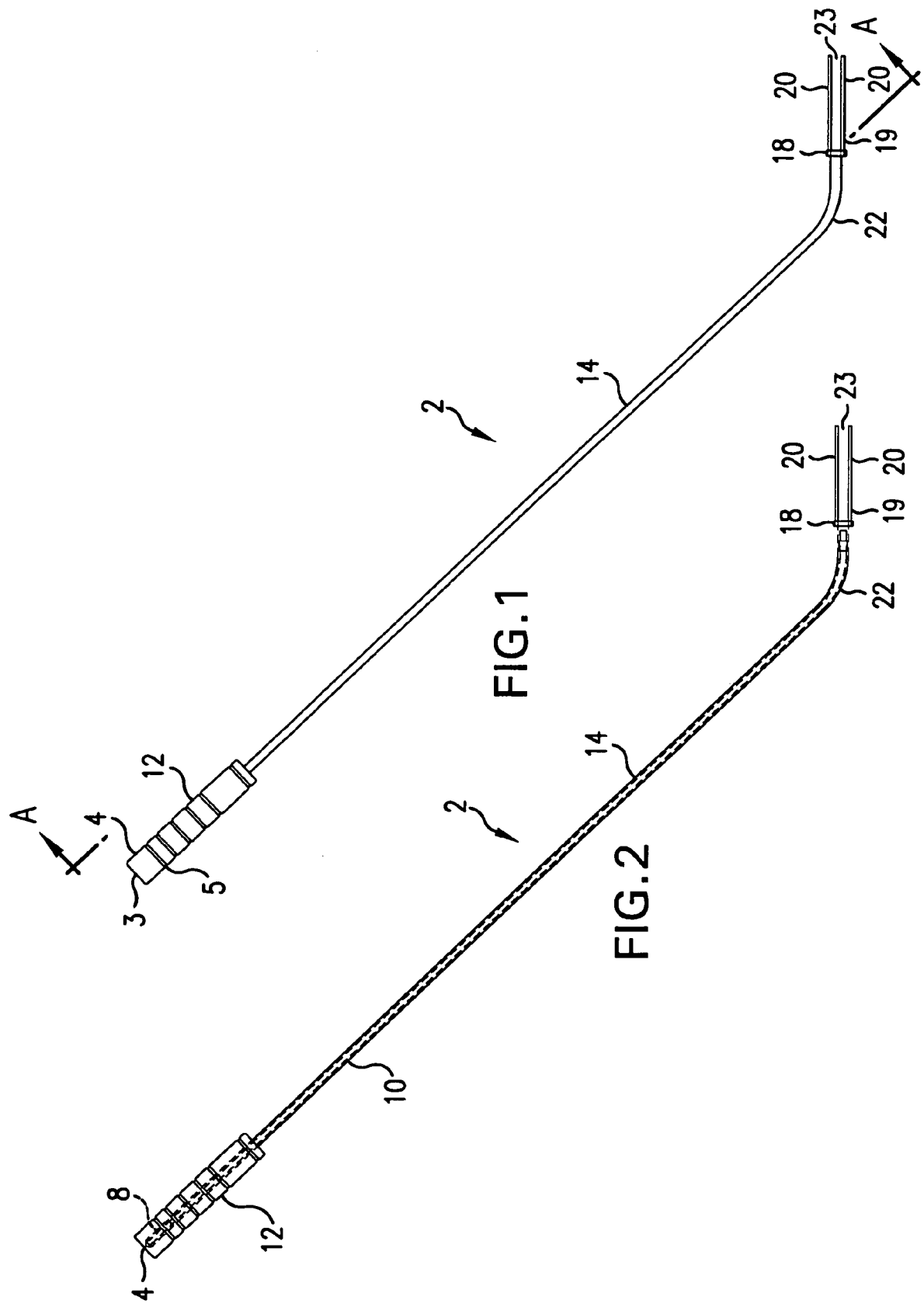

CAMPFIRE ROTISSERIE

The invention disclosed herein deals with a handle held, roasting device with an internally driven bifurcated rotisserie. More specifically one end has a turning knob which propels an internal drive cable that operates a bifurcated rotisserie at the opposite end which is placed within close proximity to a heat source allowing the user to stand clear of the heat source while manipulating the drive cable thus rotating the bifurcated end, in turn rotating the selected item to be roasted.

BACKGROUND OF THE INVENTION

The use of roasters to cook items above a heat source is not new to the art. In U.S. Pat. No. 6,754,966 issued to Holzer on Jun. 29, 2004 discloses a "Wienie Roaster" that incorporates reversible tines allowing for safe stowage. According to the website for the original "ROLLA ROASTER®" it is rotatable by its handle. The distinction here is the handle of the "ROLLA ROASTER®" is shaped in a manner that allows the user to rotate the entire roaster making it a rotisserie. The instant invention has an internal drive system that allows the user to turn the end of the handle reacting on the drive end thus engaging the internal drive cable rotating the bifurcated tines. The internal mechanism rotates not the entire roaster.

In U.S. Pat. No. 5,117,558 issued to Hull on Jun. 2, 1992 incorporates a crank at the end of the main shaft as the method of rotation. Once again, there is nothing internal about this device making the instant invention very unique relative to Hull. Hull also incorporates a sleeve that can be non-rotational, this component is used as a handle as protection from heat transfer. This handle is slidable on the upper length of the shaft. The drive cable is not internal to the device.

In U.S. Pat. No. 5,355,778, issued to Mayfield on Oct. 18, 1994 discloses a rotatable basket type apparatus, again the device is attached to a shaft that is turned by hand where the entire device turns, there are no internal parts or drive cables. In the U.S. Pat. No. 4,517,885 issued to Thompson on May 21, 1985 discloses a "Wiener Roaster" that has a sleeve portion that is used as a handle. The prior art does not have the combined effect of the instant invention. The instant invention has a radius bend essentially near the near end of the hollow shaft. The radius bend enables the user to use the utensil from either a standing or sitting position and allows the rotisserie action to work from either position. The radius bend also allows the roaster to rest on a campfire ring or on a log while the food remains well above the heat source and at an inverted angle that helps prevent the loss of food.

THE INVENTION

The device that is disclosed herein is a portable, hand held roasting device comprising in combination, a hollow tubular body; a fixed handle having a near end; a bifurcated tine; a drive handle having a distal end and a drive cable. The hollow tubular body has a near end, a distal end, and a hollow center, the distal end of the hollow tubular body having a fixed handle affixed thereto; the hollow body having located therein, the drive cable. The drive cable has a near end and a distal end, the distal end of the drive cable has affixed thereto, the bifurcated tine, and the near end of the drive cable has affixed thereto, the rotatable drive handle. The hollow tubular body has a radius bend near the distal end, there being located between the fixed handle near end and the drive handle distal end, a bearing surface.

BRIEF DESCRIPTION OF THE DRAWINGS

FIG. 1 is a full side view of the roaster.
FIG. 2 is a cross sectional view of FIG. 1 through line A—A.

DETAILED DESCRIPTION OF THE INVENTION

Figure 3:
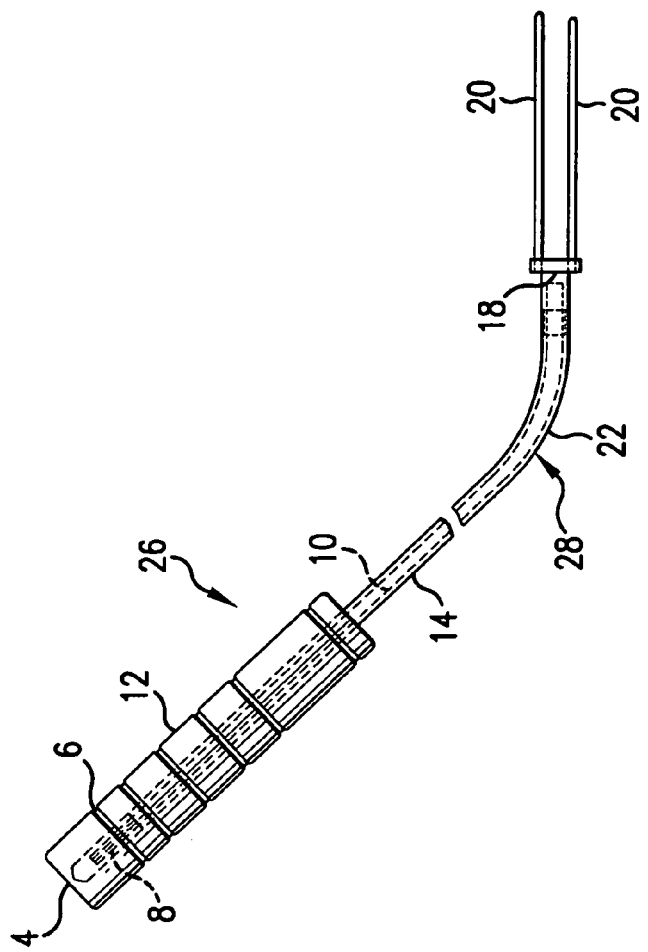
FIG. 3 is a portion of the cross sectional view of FIG. 2 with more detail.

FIGS. 1–7 show the distal end 26 of the campfire roaster 2 that has a drive handle 4. The drive handle 4 has a distal end 3 and a near end 5. The distal end 3 of drive handle 4 is where the operator manipulates the drive to rotate or rotisserate the bifurcated tines 20. The near end 5 of the drive handle 4 is attached to the distal end of the drive cable 8. The spacer or bearing surface 6 separates the drive handle 4 and the fixed handle 12. The fixed handle 12 incorporates the distal end of the drive cable 8, hollow tubular body 14 and the drive cable 10. The drive cable 10 internally runs the length of the hollow tubular body 14 to its terminus at the distal end of the coupler 17. The hollow tubular body 14 has a radius bend 22 near its near end. The drive shaft 10 has a near end 24 that is attached to the distal end of the coupler 17. The coupler 18 is comprised of its distal end 17 and its near end 19. The near end of the coupler 19 has a minimum of two bifurcated tines 20 affixed by their distal end 21. The bifurcated tines 20 have a distal end 21 and a near end 23. The near end of the tine 23 is the point where food items are placed on the roaster 2.

FIG. 1 shows a full side view of the campfire roasters exterior. Shown is the exterior of the internally driven rotisserating device. The distal end 3 of the drive handle 4 is located at the distal end of the roasting device 26. The near end 5 of the drive handle 4 is also shown. All of these items are shown above the fixed handle 12. Incorporated within the fixed handle 12 is the hollow tubular body 14 that incorporates the internal drive cable. At essentially the near end of the hollow tubular body 14 is the radius bend 22. Also present is the coupler 18, the coupler near end 19, the bifurcated tines 20 and the near end of the bifurcated tines 23.

FIG. 2 is a cross sectional view of FIG. 1 through line A—A. This view shows the internal workings or mechanism that makes this device truly unique. The drive handle 4 is attached to the distal end of the drive cable 8. The drive cable 8 is incorporated within the fixed handle 12 as well as the hollow tubular body 14. Attached to the distal end of the drive cable 8 is the internal drive shaft 10. This internal drive shaft runs the complete length of the hollow tubular body 14 terminating at the end of the hollow tubular body 14 and the coupler 18 in which the drive shaft 8 is attached thereto. Attached to the coupler 18 are the bifurcated tines 20.

FIG. 3 is an exploded view of FIG. 2. It shows in greater detail the distal end 26 and the near end 28 of the roaster 2. Starting with the distal end 26 there is shown spacer 6 and the distal end of the drive cable 8. The drive handle 4 and the fixed handle 12. Also shown is the hollow tubular body 14 and the drive shaft 10. The near end 28 of the roaster 2 shows the radius bend 22. Beyond the radius bend 22 is the coupler 18 with bifurcated tines 20 attached.

Figure 4:
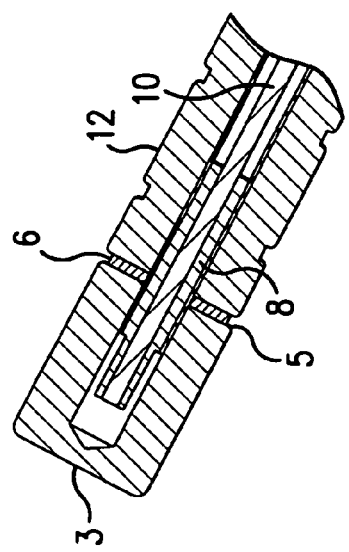
FIG. 4 is a cross sectional view of distal end of device.

FIG. 4 is an exploded view of the drive handle 4 and the fixed handle 12. Shown internally is the detail of the distal end 3 of the drive handle 4. The distal end of the drive cable 8 is attached to the drive handle 4 through the near end of the drive handle 5. The spacer 6 fits between the near end 5 of the drive handle 4 and the distal end of the fixed handle 12. The spacer provides clearance for the drive end to rotate without restrictions from the fixed end. Also present in this figure is the drive shaft 10 attached to the distal end of the drive cable 8.

Figure 5:
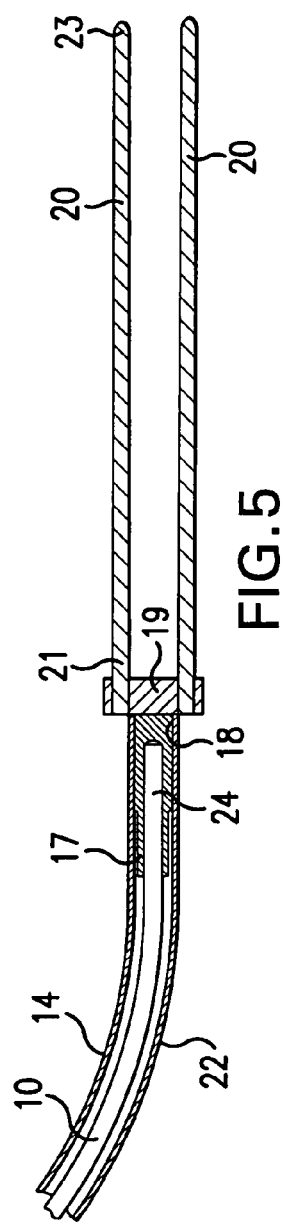
FIG. 5 is a cross sectional view of the near end.
Figure 6:
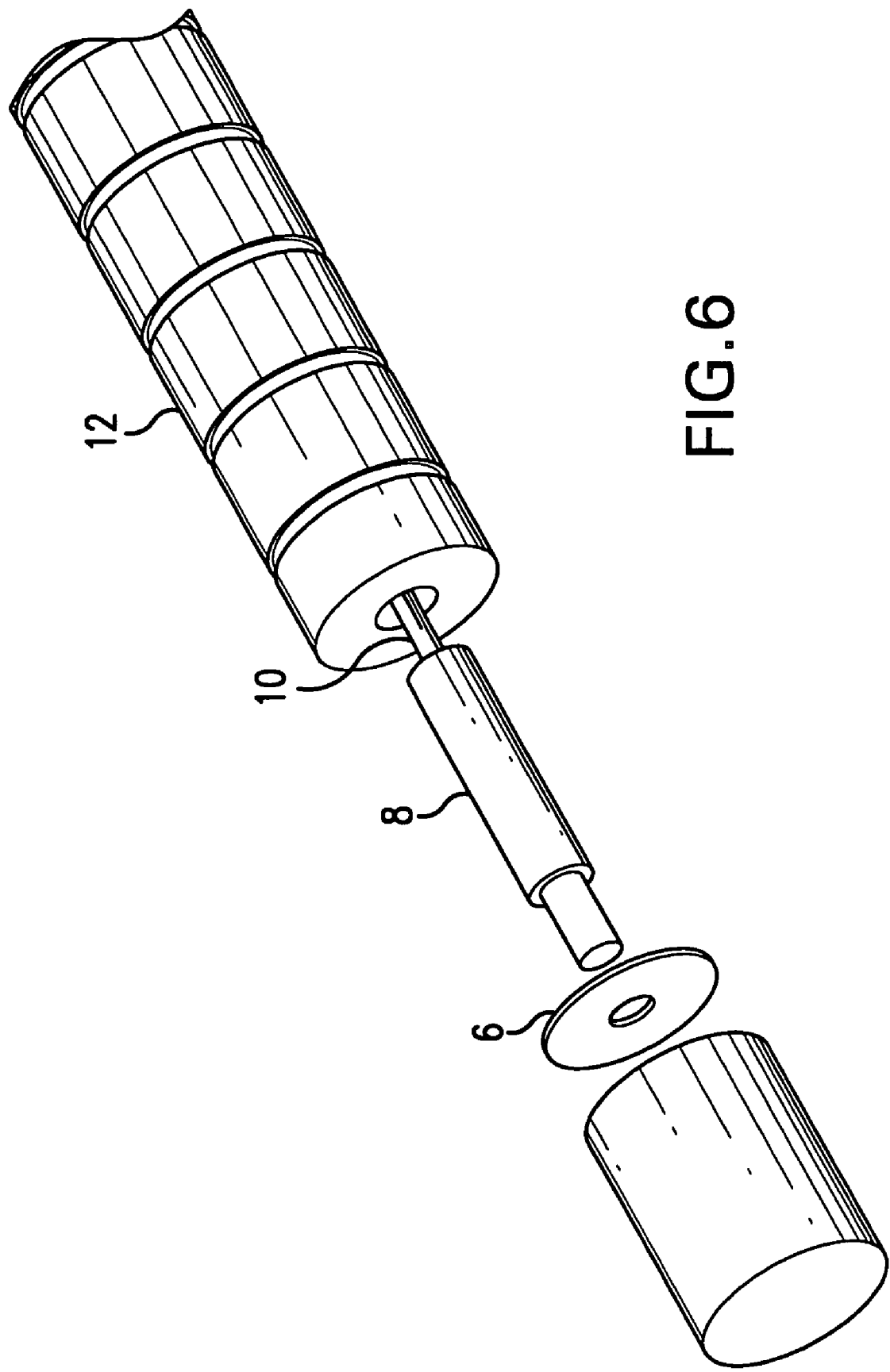
FIG. 6 is an exploded view of the distal end of the device.
Figure 7:
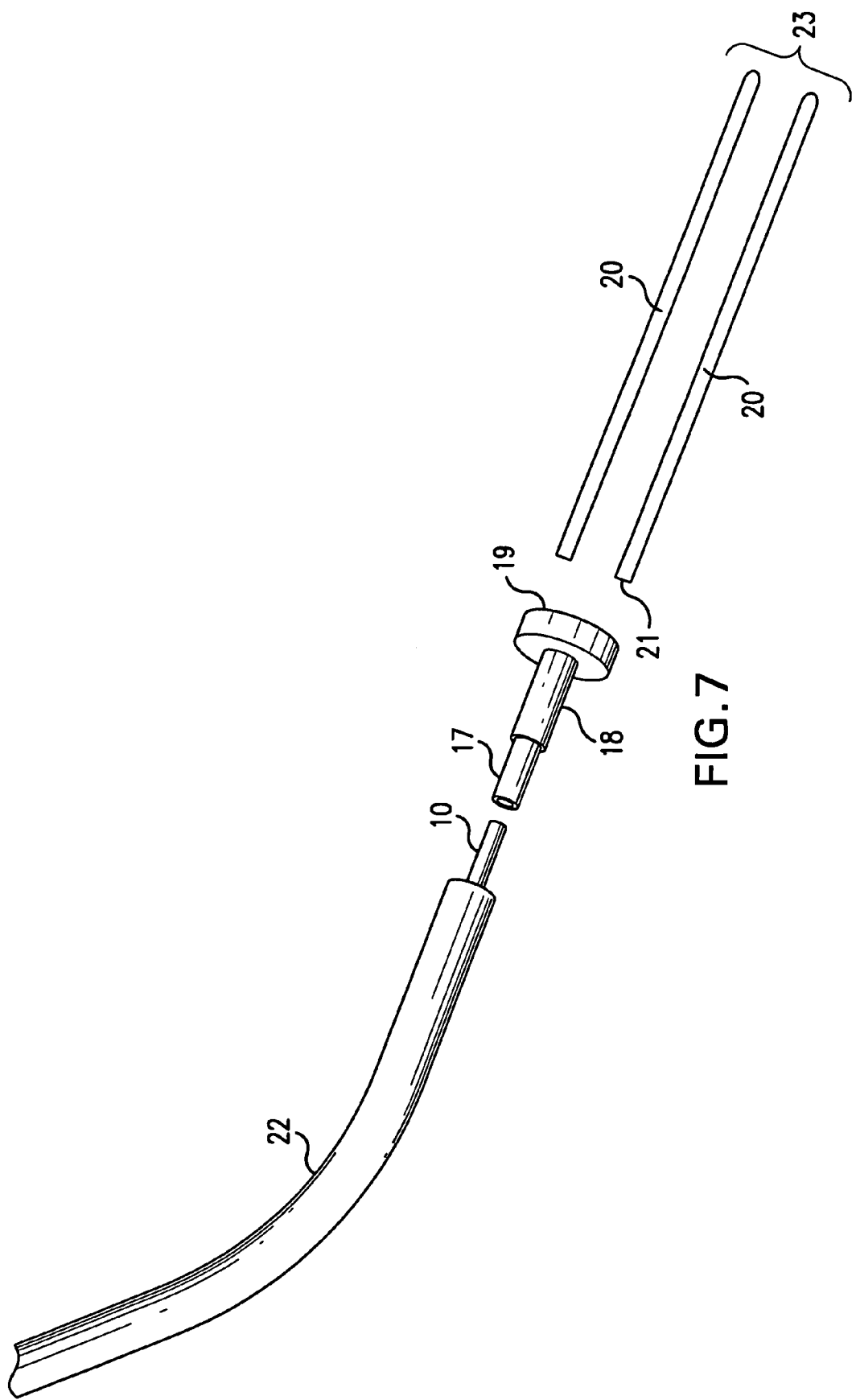
FIG. 7 is an exploded view of the near end of device.
Figure 8:
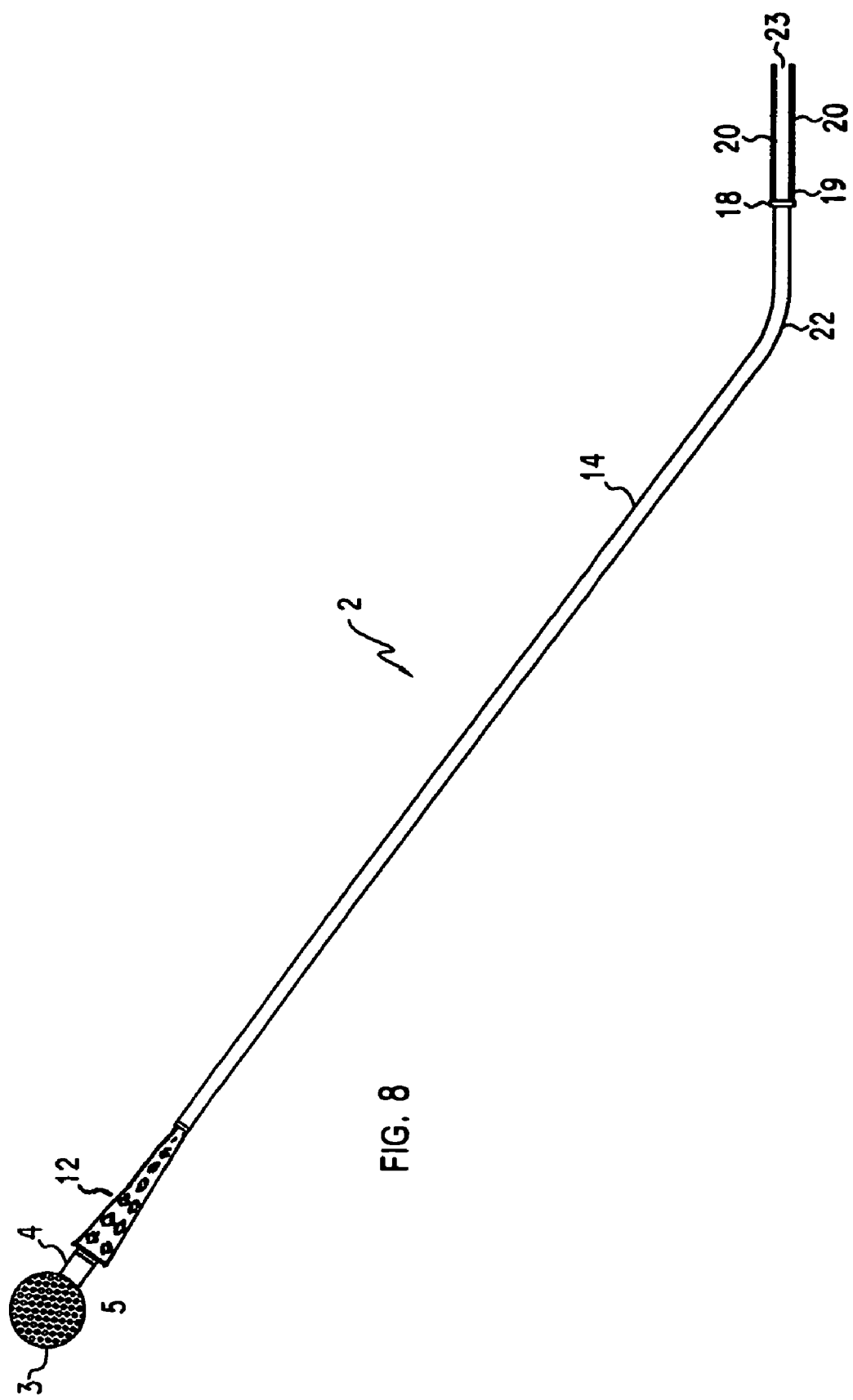
FIG. 8 shows a golf ball drive handle and a golf club handle fixed handle.
Figure 9:
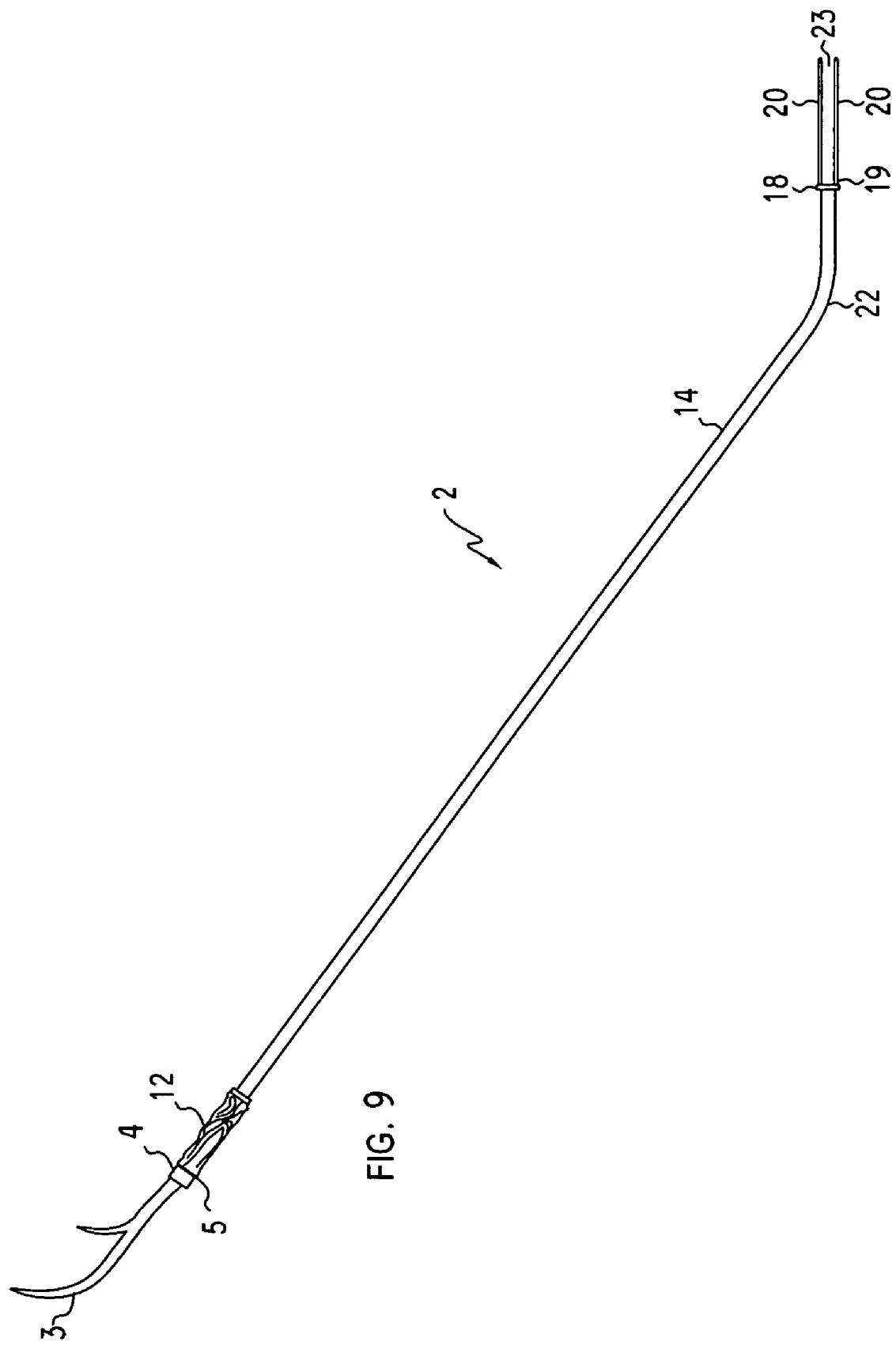
FIG. 9 shows a deer antler drive handle and a deer antler base fixed handle.
Figure 10:
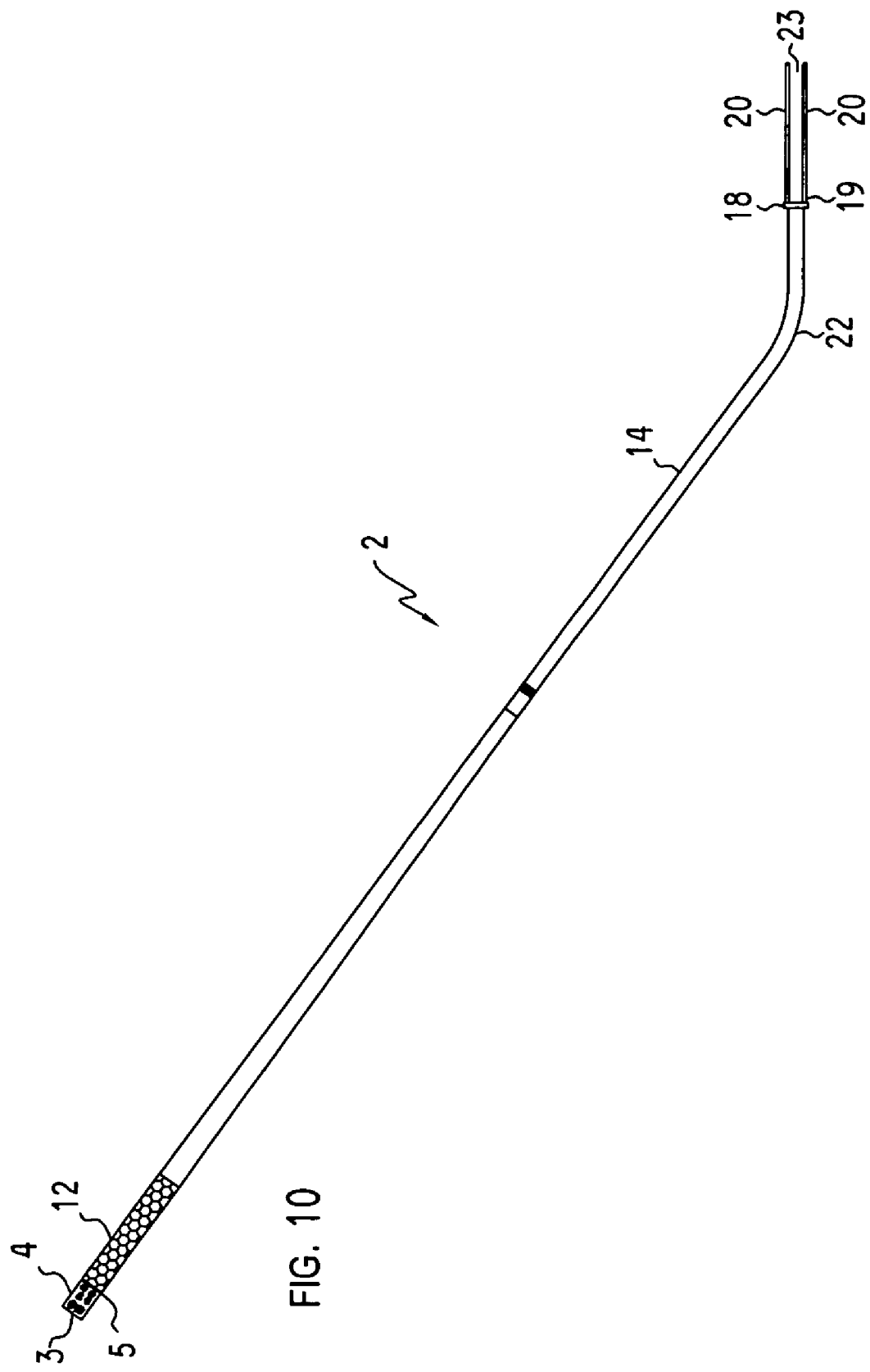
FIG. 10 shows a pool cue drive and fixed handle.
Figure 11:
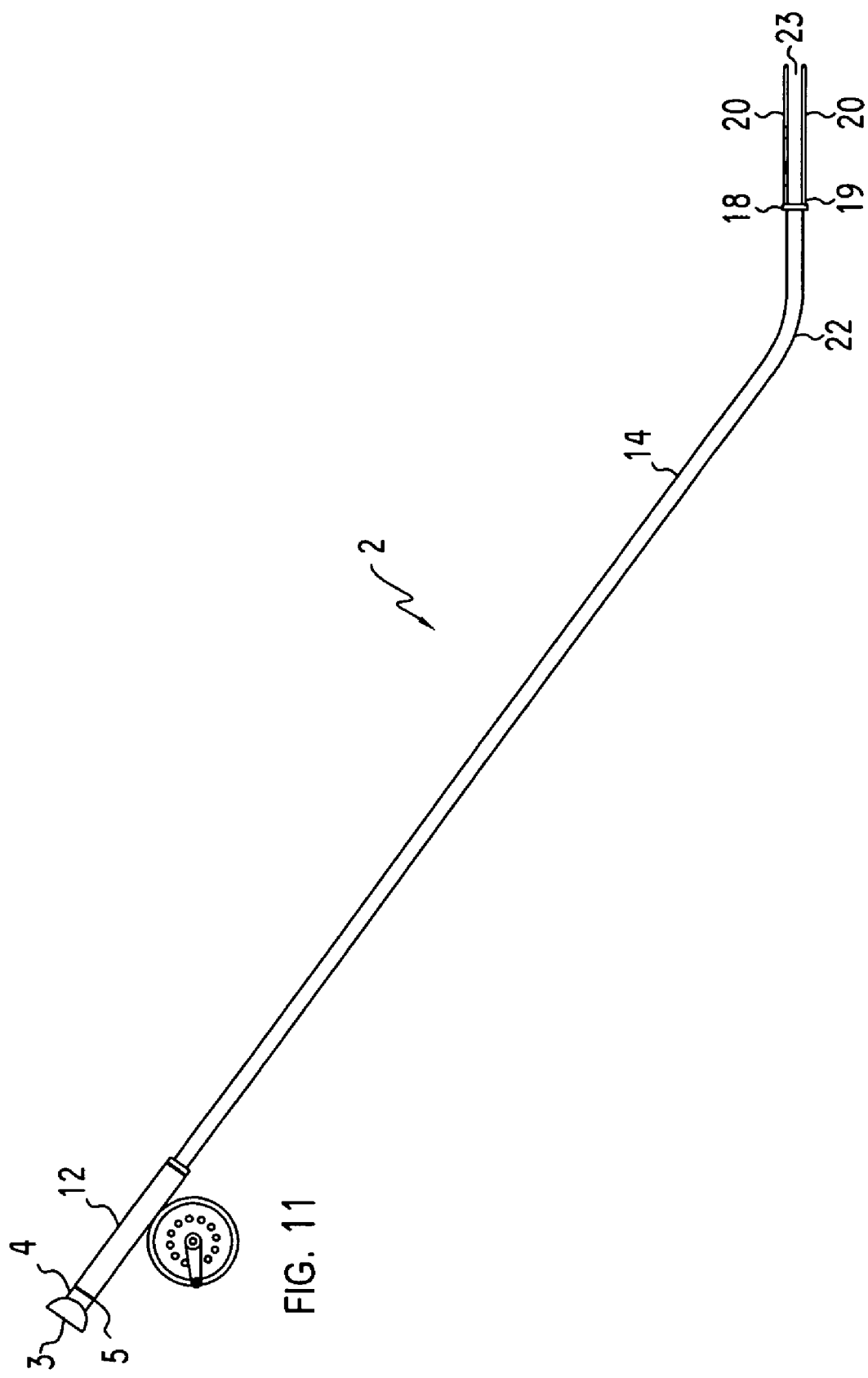
FIG. 11 shows a fishing pole handle with attached fishing reel.
Figure 12:
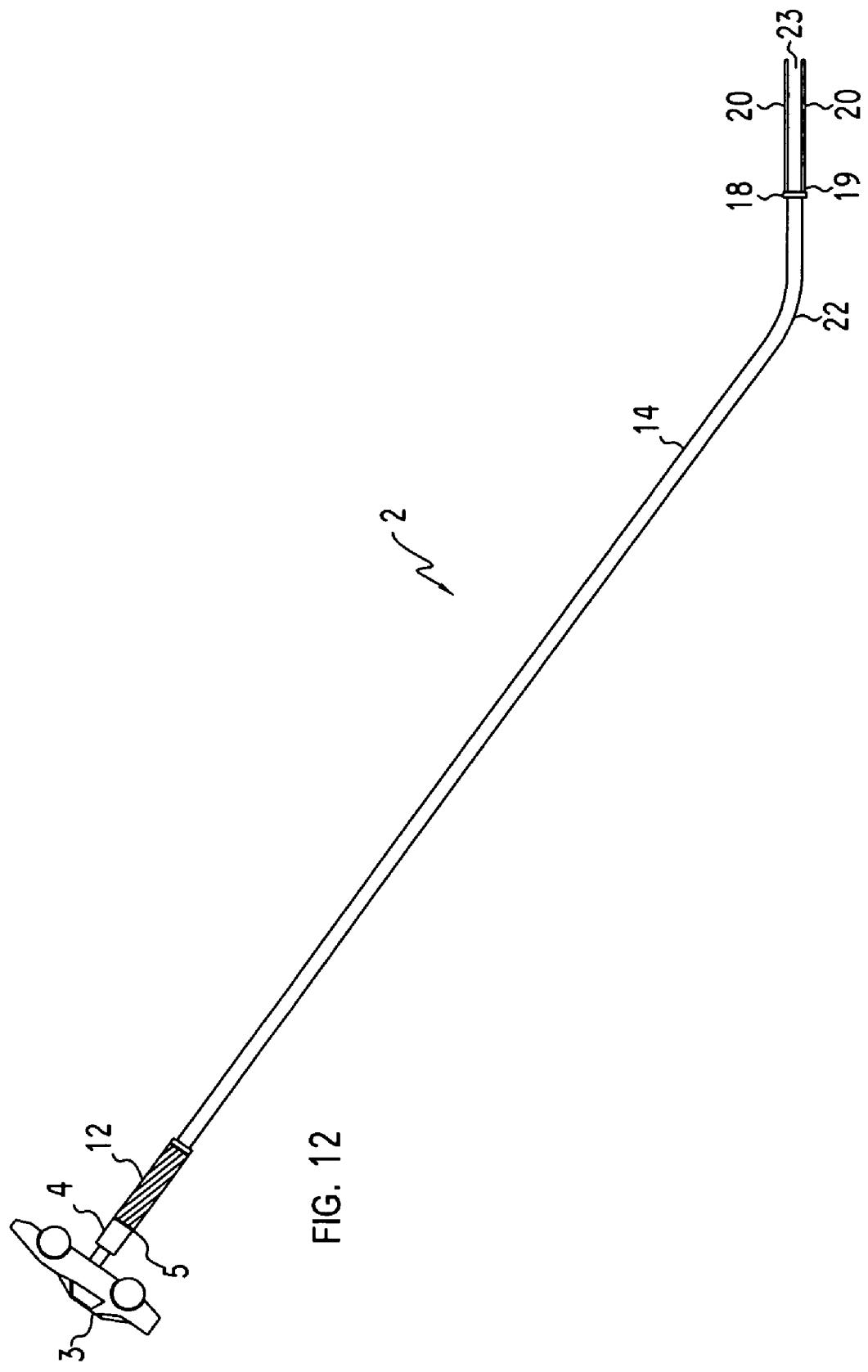
FIG. 12 shows a die cast miniature car drive handle.

FIG. 5 is an exploded view of the near end of the campfire rotisserie showing the radius bend 22 of the hollow tubular body 14 incorporating the drive shaft 10. The drive shaft 10 proceeds to the distal end 17 of the coupler 18. The near end 19 of coupler 18 shows the attachment of the distal end 21 of bifurcated tines 20. The near end 23 of the bifurcated tines 20 is also shown.

The handle of this device can be owner specific, meaning that the user may wish to have the handle specially designed to suit their own personnel taste. The owner can have the custom handle such as deer antlers, specialty golf balls, fishing reels, golf club, pool cue, pool ball, wood carvings, duck call, die cast cars, company logos, etc.

The device is superior in that it allows the user to roast over a heat source at a greater distance, either standing or sitting with ergonomically correct positioning. By simply rotating the end of the handle the user is rotating the roasting item from a comfortable safe distance. It should be noted that the fixed handle and the rotatable handle can be replaced by a motor that drives the internal cable. Preferred is a motor that is battery driven. The campfire rotisserie drive cable is manufactured from metal, plastic, nylon, Teflon, graphite, composite plastics, polyethylene, polypropylene, cross linked polyethylene. The handle is made from wood, plastic, nylon, Teflon, graphite, composite plastic or metal. The hollow tubular body is made of metal or ceramic. The bifurcated tines are made of stainless steel.

What is claimed is:

1. A portable, hand held roasting device comprising in combination:
   a. a hollow tubular body;
   b. a fixed handle having a near end;
   c. a bifurcated tine;
   d. a rotatable drive handle having a distal end;
   e. a drive cable;
   said hollow tubular body having a near end, a distal end, and a hollow center, the near end of the hollow tubular body having the fixed handle affixed thereto; the hollow body having located therein, the drive cable;
   said drive cable having a near end and a distal end, the distal end of the drive cable having affixed thereto, the bifurcated tine, and the near end of the drive cable having affixed thereto, the rotatable drive handle;
   said hollow tubular body having a radius bend near the distal end, there being located between the fixed handle near end and the drive handle distal end, a bearing surface.

2. A portable, hand held roasting device as claimed in claim 1, wherein the device has at least 2 tines.

3. A portable, hand held roasting device as claimed in claim 1, wherein the drive cable is manufactured from a material selected from the group consisting metal, plastic, nylon, Teflon, graphite, composite plastics, polyethylene, polypropylene, and cross linked polyethylene.

4. A portable, hand held roasting device as claimed in claim 1, wherein the fixed handle is made from a material selected from the group consisting of wood, plastic, nylon, Teflon, graphite, composite plastic, and metal.

5. A portable, hand held roasting device as claimed in claim 1, wherein the hollow tubular body is made of metal.

6. A portable, hand held roasting device as claimed in claim 1, wherein the hollow tubular body is made of ceramic.

7. A portable, hand held roasting device as claimed in claim 1, wherein the bifurcated tines are made of stainless steel.

8. A portable, hand held roasting device as claimed in claim 1, wherein the hollow tubular body has a radius bend near the distal end.

9. A portable, hand held roasting device as claimed in claim 8, wherein the radius bend is in the range of 20° to 60°.

10. A portable, hand held roasting device as claimed in claim 8, wherein the radius bend is in the range of 30° to 50°.

11. A portable, hand held roasting device as claimed in claim 8, wherein the radius bend is about 450.

12. A portable, hand held roasting device as claimed in claim 1, wherein said rotatable drive handle rotates in a clockwise direction.

13. A portable, hand held roasting device claimed in claim 1, wherein said rotatable drive handle rotates in a counter clockwise direction.

14. A portable, hand held roasting device as claimed in claim 1, wherein the fixed handle is a golf club handle and the drive handle is a golf ball.

15. A portable, hand held roasting device as claimed in claim 1, wherein the fixed handle is a deer antler and the drive handle is an antler base.

16. A portable, hand held roasting device as claimed in claim 1, wherein the fixed handle and the drive handle is a billiard cue.

17. A portable, hand held roasting device as claimed in claim 1, wherein the fixed handle is a fishing pole handle and the drive handle is a fishing pole handle end.

18. A portable, hand held roasting device as claimed in claim 1, wherein the drive handle is a die cast miniature car.

* * * * *